United States Patent
Koike (10) Patent No.: US 10,298,156 B2
(45) Date of Patent: May 21, 2019

(54) DRIVING DEVICE, DRIVE SYSTEM, IMAGE FORMING APPARATUS, CONVEYANCE DEVICE, AND DRIVING METHOD

(71) Applicant: Takahisa Koike, Tokyo (JP)

(72) Inventor: Takahisa Koike, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/905,862

(22) Filed: Feb. 27, 2018

(65) Prior Publication Data

US 2018/0254721 A1    Sep. 6, 2018

(30) Foreign Application Priority Data

Mar. 2, 2017   (JP) ................. 2017-039861

(51) Int. Cl.
| | |
|---|---|
| H02K 17/34 | (2006.01) |
| H02P 5/51 | (2016.01) |
| B65H 5/06 | (2006.01) |
| G03G 15/00 | (2006.01) |
| H02P 5/747 | (2006.01) |

(52) U.S. Cl.
CPC .............. *H02P 5/51* (2016.02); *B65H 5/06* (2013.01); *G03G 15/50* (2013.01); *G03G 15/6529* (2013.01); *G03G 15/6558* (2013.01); *H02P 5/747* (2013.01); *B65H 2403/943* (2013.01); *B65H 2601/254* (2013.01); *G03G 2221/1657* (2013.01)

(58) Field of Classification Search
CPC .............................. H02P 5/51; G03G 15/6558
See application file for complete search history.

(56) References Cited

U.S. PATENT DOCUMENTS

| | | | | |
|---|---|---|---|---|
| 4,906,906 | A | * | 3/1990 | Lautzenhiser ........... A61G 5/04 |
| | | | | 318/269 |
| 2016/0214415 | A1 | * | 7/2016 | Kawai ................... B41J 3/4075 |

FOREIGN PATENT DOCUMENTS

| | | |
|---|---|---|
| JP | 2009-069604 | 4/2009 |
| JP | 2010-209993 | 9/2010 |
| JP | 2010-236603 | 10/2010 |
| JP | 2013-009532 | 1/2013 |

* cited by examiner

*Primary Examiner* — Karen Masih
(74) *Attorney, Agent, or Firm* — Oblon, McClelland, Maier & Neustadt, L.L.P.

(57) ABSTRACT

A driving device for driving a first motor to transmit a driving force to a driven object and a second motor to transmit a driving force to the driven object include a controller and a corrector. The controller outputs a first voltage command value to drive the first motor and a second voltage command value to drive the second motor. The corrector corrects the first voltage command value and the second voltage command value, based on a parameter relating to driving of the first motor and the second motor obtained when an output torque of the first motor and an output torque of the second motor are applied to the driven object in opposite directions.

11 Claims, 11 Drawing Sheets

DRIVING DEVICE, DRIVE SYSTEM, IMAGE FORMING APPARATUS, CONVEYANCE DEVICE, AND DRIVING METHOD

CROSS-REFERENCE TO RELATED APPLICATION

This patent application is based on and claims priority pursuant to 35 U.S.C. § 119(a) to Japanese Patent Application No. 2017-039861, filed on Mar. 2, 2017, in the Japan Patent Office, the entire disclosure of which is hereby incorporated by reference herein.

BACKGROUND

Technical Field

This disclosure relates to a driving device, a drive system, an image forming apparatus, a conveyance device, and a driving method.

Related Art

There are drive systems that include a plurality of motors to drive one driven object such as a driving shaft, a conveyance belt, and the like, for example, to increase driving torque of the driven object or reduce backlash.

SUMMARY

According to an embodiment of this disclosure, an improved driving device for driving a first motor to transmit a driving force to a driven object and a second motor to transmit a driving force to the driven object include a controller and a corrector. The controller outputs a first voltage command value to drive the first motor and a second voltage command value to drive the second motor. The corrector corrects the first voltage command value and the second voltage command value, based on a parameter relating to driving of the first motor and the second motor obtained when an output torque of the first motor and an output torque of the second motor are applied to the driven object in opposite directions.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

The accompanying drawings are intended to depict embodiments of the present disclosure and should not be interpreted to limit the scope thereof. The accompanying drawings are not to be considered as drawn to scale unless explicitly noted. In addition, identical or similar reference numerals designate identical or similar components throughout the several views.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

Referring now to the drawings, wherein like reference numerals designate identical or corresponding parts throughout the several views thereof. As used herein, the singular forms "a", "an", and "the" are intended to include the plural forms as well, unless the context clearly indicates otherwise.

Hereinafter, an embodiment of the present disclosure is described with reference to the drawings.

Configuration of Image Forming Apparatus 100

Figure 1:
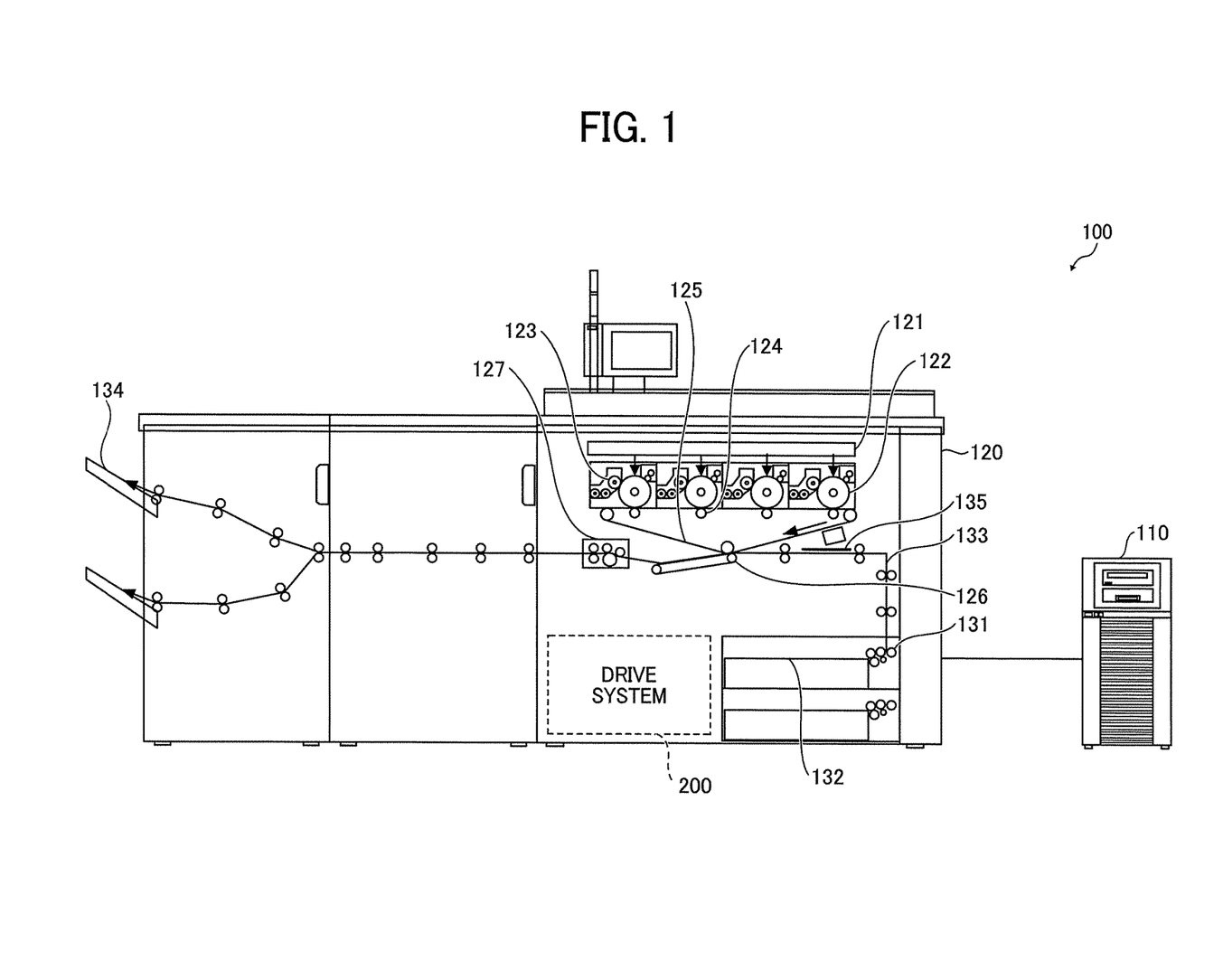
FIG. 1 is a schematic view of an image forming apparatus according to an embodiment of the present disclosure.

FIG. 1 is a schematic view of an image forming apparatus 100 according to the embodiment of the present disclosure. The image forming apparatus 100 illustrated in FIG. 1 includes a print server 110 and a main body 120. The print server 110 stores print data. The print data stored in the print server 110 is transmitted to the main body 120 according to an instruction from a user.

The main body 120 includes an optical device 121, photoconductor drums 122, developing rollers 123, transfer rollers 124, a transfer belt 125, a transfer roller 126, a fixing device 127, a conveyance device 131, a sheet tray 132, a conveyance path 133, and a sheet ejection tray 134 and forms a toner image on a recording sheet 135.

The main body 120 performs processing such as a color correction, a density conversion, and a value reduction on the print data. Then, the main body 120 transmits the print data that has finally become binary to the optical device 121.

The optical device 121 uses a laser diode or the like as a laser light source. The optical device 121 irradiates the photoconductor drum 122 in a uniformly charged state with laser light corresponding to the print data.

Charges on the photoconductor drum 122 in the uniformly charged state are lost only in the portion irradiated with the laser light. Thus, a latent image corresponding to the print data is formed on the surface of the photoconductor drum 122. The latent image moves toward the corresponding developing roller 123 as the photoconductor drum 122 rotates.

While rotating, the developing roller 123 adheres toner supplied from a toner cartridge onto a surface thereof. Then, the toner adhering to the surface of the developing roller 123 adheres to the latent image formed on the surface of the photoconductor drum 122. Thus, the developing roller 123 visualizes the latent image on the surface of the photoconductor drum 122 and forms the toner image on the surface of the photoconductor drum 122.

The toner image on the surface of the photoconductor drum 122 is transferred onto the transfer belt 125 between the photoconductor drum 122 and the transfer roller 124. Thus, the toner image is formed on the transfer belt 125.

In an example illustrated in FIG. 1, the optical device 121, the photoconductor drum 122, the developing roller 123, and the transfer roller 124 are provided for each of the four printing colors (yellow, cyan, magenta, and black). Thus, toner images of respective printing colors are formed on the transfer belt 125.

The conveyance device 131 feeds the recording sheet 135 from the sheet tray 132 to the conveyance path 133. The recording sheet 135 fed to the conveyance path 133 is conveyed between the transfer belt 125 and the transfer roller 126. Thus, the toner images of respective printing colors on the transfer belt 125 are transferred onto the recording sheet 135 between the transfer belt 125 and the transfer roller 126. Thereafter, heat and pressure are applied to the recording sheet 135 by the fixing device 127 to fix the toner images. Then, the recording sheet 135 is conveyed to the sheet ejection tray 134.

As illustrated in FIG. 1, the image forming apparatus 100 further includes a drive system 200. In the image forming apparatus 100, the drive system 200 is applied to a driving mechanism (for example, sheet feeder, sheet conveyor, and the like) that requires positioning control. The drive system 200 includes a first motor 221 and a second motor 222 (see FIG. 2) to control driving of the first motor 221 and the second motor 222.

Example of Driving Mechanism Using First Motor and Second Motor

Figure 2:
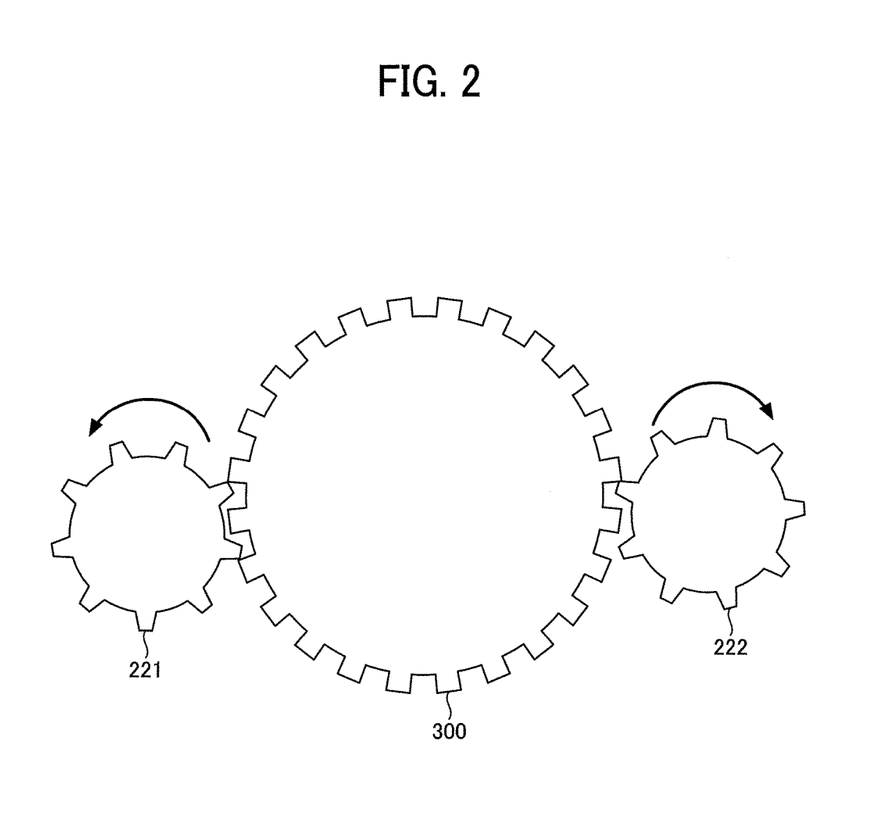
FIG. 2 is a schematic view illustrating an example of a driving mechanism using a first motor and a second motor according to an embodiment of the present disclosure.

FIG. 2 is a schematic view illustrating an example of a driving mechanism using a first motor and a second motor according to the present embodiment.

The first motor 221 and the second motor 222 drive a driven object in the image forming apparatus 100. As illustrated in FIG. 2, a gear-shaped output shaft 300 is used as an example of the driven object. In the image forming apparatus 100, the output shaft 300 is for driving various rollers (for example, a sheet feeding roller, a sheet conveyance roller, and the like) to convey the recording sheet 135.

As illustrated in FIG. 2, both the first motor 221 and the second motor 222 are provided with gears on the drive shaft, and the gear meshes and rotates with the output shaft 300 to rotationally drive the output shaft 300.

In the configuration of FIG. 2, for example, by driving the first motor 221 and the second motor 222 in opposite directions, it is possible to reduce backlash (i.e., tolerance or play between the gears) of the output shaft 300.

In addition, in the configuration of FIG. 2, for example, by driving the first motor 221 and the second motor 222 in an identical direction, it is possible to make the output shaft 300 rotate at a higher torque (i.e., combined output torque of the first motor 221 and the second motor 222).

Here, the drive system 200 according to the present embodiment can drive each of the first motor 221 and the second motor 222 so that output torques of the first motor 221 and the second motor 222 coincide with each other. Therefore, according to the drive system 200 of the present embodiment, it is possible to prevent various troubles (for example, speed fluctuation, deformation of mechanism component, gear wear, etc.) that may be caused by a torque imbalance of the first motor 221 and the second motor 222 (hereinafter, also referred to as "two motors 221 and 222").

Further, the drive system 200 according to the present embodiment performs offset control for controlling a voltage command value of the first motor 221 (i.e., first voltage command value) and a voltage command value of the second motor 222 (i.e., second voltage command value). Therefore, the drive system 200 can drive the first motor 221 and the second motor 222 while eliminating the backlash between the two motors 221 and 222 and the output shaft 300. That is, according to the drive system 200 of the present embodiment, since the backlash can be eliminated by voltage control, the backlash can be eliminated at low cost as compared with a comparative method for eliminating the backlash by current control. Hereinafter, these points are specifically described.

Configuration of Drive System 200

Figure 3:
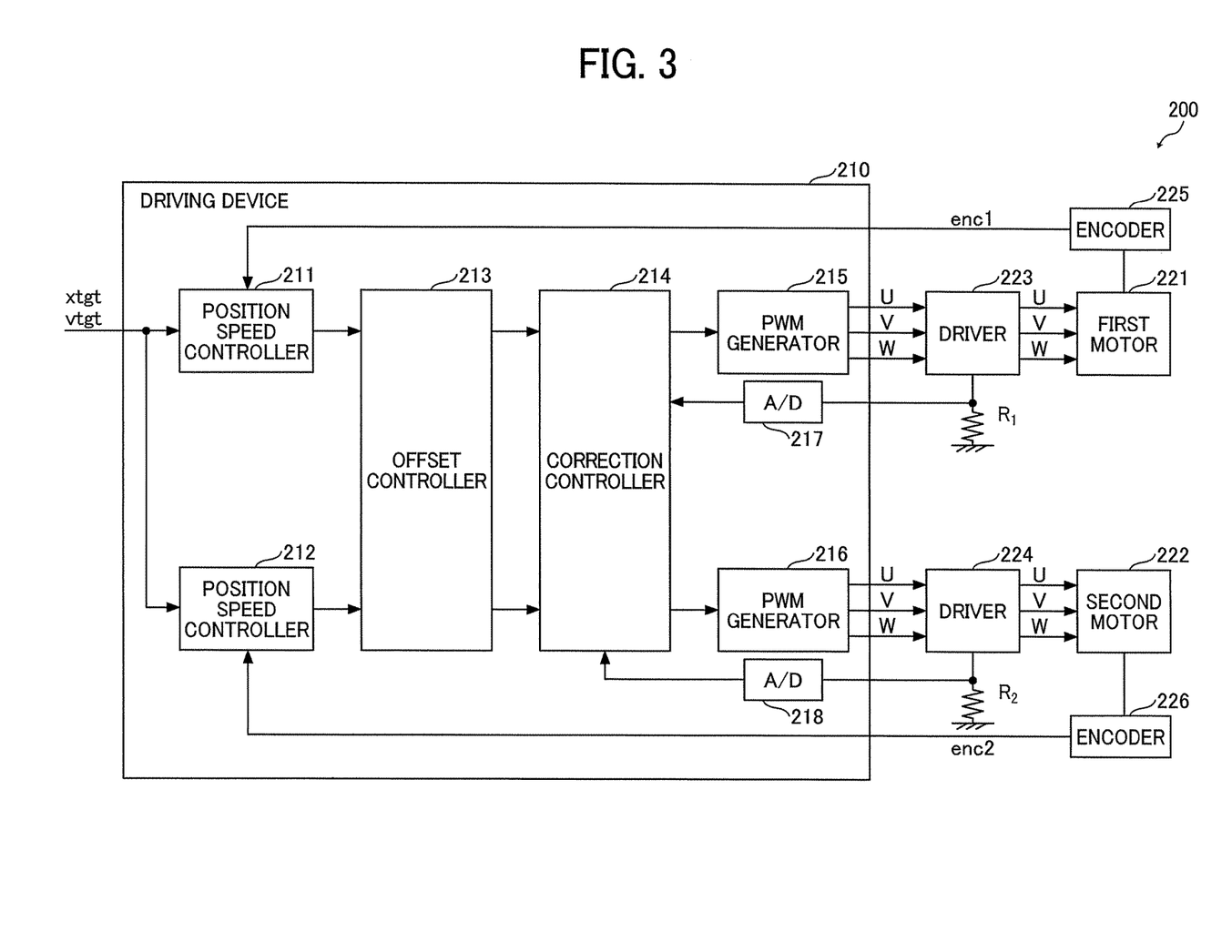
FIG. 3 is a block diagram illustrating a configuration of a drive system included in the image forming apparatus according to an embodiment of the present disclosure.

FIG. 3 is a block diagram illustrating a configuration of the drive system 200 included in the image forming apparatus 100 according to the present embodiment. As illustrated in FIG. 3, in addition to the first motor 221 and the second motor 222 illustrated in FIG. 2, the drive system 200 includes a driving device 210, a driver 223, a driver 224, an encoder 225, an encoder 226, a resistor $R_1$, and a resistor $R_2$.

The driving device 210 includes position speed controllers 211 and 212, an offset controller 213, a correction controller 214, pulse width modulation (PWM) generators 215 and 216, and analog-digital converters (A/D) 217 and 218. Instead of execution of all the functions by an electronic circuit, some of the functions of the driving device 210 may be computer-controlled using a combination of software and hardware. Further, the functions of the driving device 210 may be executed by a plurality of circuits or a plurality of software.

The encoder 225 is disposed on a rotary shaft of the first motor 221, and outputs an encoder signal enc1 of the first motor 221. The encoder signal enc1 is supplied to the position speed controller 211 of the driving device 210 and is used for proportional integral differential (PID) control of the position and speed of the first motor 221 by the position speed controller 211.

The encoder 226 is disposed on a rotary shaft of the second motor 222, and outputs an encoder signal enc2 of the second motor 222. The encoder signal enc2 is supplied to the position speed controller 212 of the driving device 210, and is used for PID control of the position and speed of the second motor 222 by the position speed controller 212.

The resistor $R_1$ is connected to the driver 223. A current value of the current flowing through the resistor $R_1$ is supplied to the correction controller 214 of the driving device 210 via the A/D 217.

The resistor $R_2$ is connected to the driver 224. A current value of the current flowing through the resistor $R_2$ is supplied to the correction controller 214 of the driving device 210 via the A/D 218.

The position speed controller 211 performs PID control of the first motor 221 based on a position target xtgt and a velocity target vtgt input from a host controller and the encode signal enc1 of the first motor 221 output from the encoder 225. As a result, the position speed controller 211 outputs the voltage command value of the first motor 221 to match the position and speed of the first motor 221 to the position target xtgt and the velocity target vtgt. The position target xtgt, the velocity target vtgt, and the voltage command value are digital values and are represented by numerical values, for example, from −255 to 255. A lower limit and an upper limit of these numerical values may be different from each other.

The position speed controller 212 performs PID control of the second motor 222 based on the position target xtgt and the velocity target vtgt input from the host controller and the encode signal enc2 of the second motor 222 output from the encoder 226. As a result, the position speed controller 212 outputs the voltage command value of the second motor 222 to match the position and speed of the second motor 222 to the position target xtgt and the velocity target vtgt.

The offset controller 213 performs offset control for controlling the voltage command values of the first motor 221 and the second motor 222 output from the position speed controllers 211 and 212 to drive the two motors 221 and 222 while eliminating the backlash between the two motors 221 and 222 and the output shaft 300. Details of the offset control by the offset controller 213 are described later with reference to FIG. 11.

The correction controller 214 corrects the voltage command value of the first motor 221 and the second motor 222 output from the offset controller 213 (i.e., voltage command value after offset control) so that the output torques of the first motor 221 and the second motor 222 coincide with each other. Details of the correction control by the correction controller 214 are described with reference to FIG. 4 and the following.

The PWM generator 215 generates a PWM signal with a duty cycle corresponding to the voltage command value of the first motor 221 output from the correction controller 214, and supplies the PWM signal to the driver 223. The driver 223 operates in accordance with the PWM signal supplied from the PWM generator 215 to apply a driving voltage to each of U, V, and W phases of the first motor 221. As a result, the first motor 221 rotates.

The PWM generator 216 generates a PWM signal with a duty cycle corresponding to the voltage command value of the second motor 222 output from the correction controller 214, and supplies the PWM signal to the driver 224. The driver 224 operates in accordance with the PWM signal supplied from the PWM generator 216 to apply a driving voltage to each of U, V, and W phases of the second motor 222. As a result, the second motor 222 rotates.

The drivers 223 and 224 may be disposed inside the driving device 210 or, as illustrated in FIG. 3, outside the driving device 210.

Functional Configuration of Correction Controller 214

Figure 4:
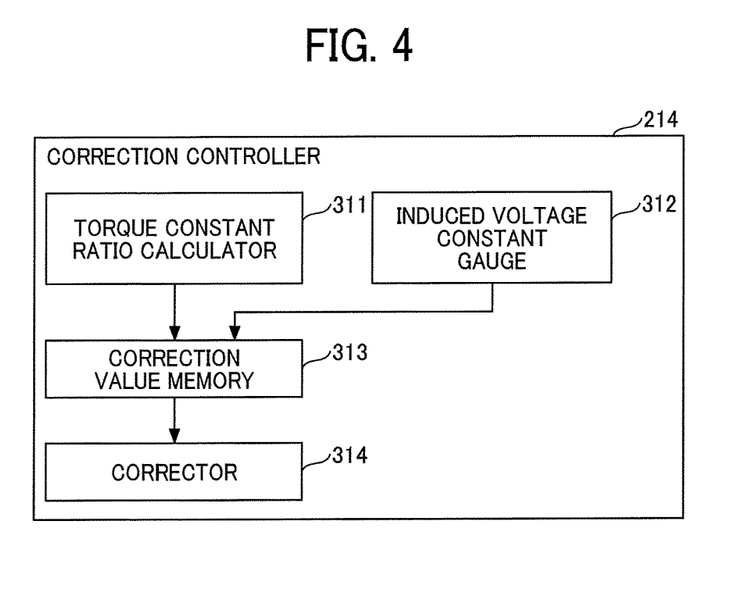
FIG. 4 is a functional block diagram of a correction controller according to an embodiment of the present disclosure.

FIG. 4 is a functional block diagram of the correction controller 214 according to the embodiment of the present disclosure. As illustrated in FIG. 4, the correction controller 214 includes a torque constant ratio calculator 311, an induced voltage constant gauge 312, a correction value memory 313, and a corrector 314.

The torque constant ratio calculator 311 calculates a torque constant ratio that is a ratio of torque constants of the first motor 221 and the second motor 222. Details of the torque constant ratio calculation processing by the torque constant ratio calculator 311 are described later with reference to FIG. 7.

The induced voltage constant gauge 312 measures an induced voltage constant of each of the first motor 221 and the second motor 222. Details of the induced voltage constant measurement processing by the induced voltage constant gauge 312 are described later with reference to FIG. 8.

The correction value memory 313 stores the torque constant ratio calculated by the torque constant ratio calculator 311 and the induced voltage constant measured by the induced voltage constant gauge 312. As a result, the torque constant ratio and the induced voltage constant are repeatedly usable until a predetermined monitoring time elapses from when the torque constant ratio and the induced voltage constant are stored in the correction value memory 313.

The corrector 314 corrects the voltage command value of each of the first motor 221 and the second motor 222 so that the output torque of the first motor 221 and the output torque of the second motor 222 coincide with each other based on the torque constant ratio calculated by the torque constant ratio calculator 311 and the induced voltage constant measured by the induced voltage constant gauge 312. In particular, the corrector 314 can correct the voltage command value of each of the first motor 221 and the second motor 222, based on parameters relating to the driving of the first motor 221 and the second motor 222 obtained when the output torques of the first motor 221 and the second motor 222 are applied to the driven object in opposite directions. Here, the parameters relating to driving of each motor include the driving voltage, the current value, and a rotation speed (the number of rotations per minute) of each motor. Details of the correction processing by the corrector 314 are described later with reference to FIGS. 9 and 10.

Procedure of Driving Process by Driving Device 210

Figure 5:
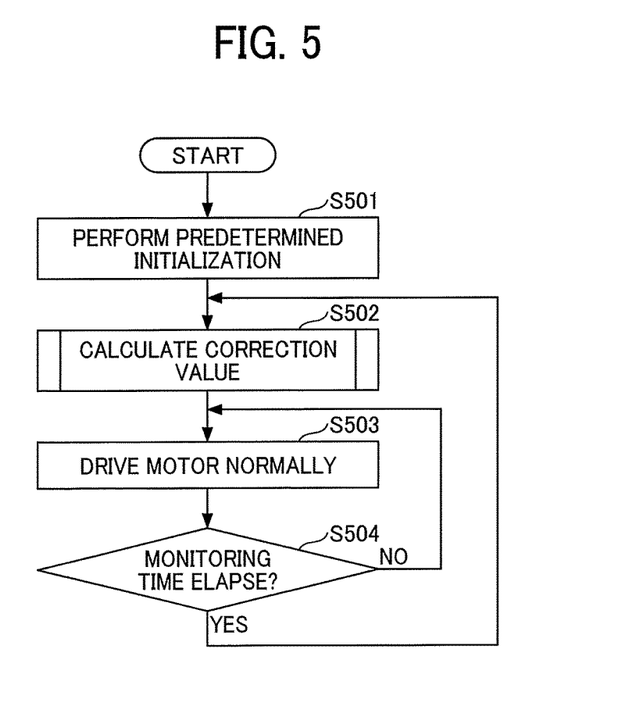
FIG. 5 is a flowchart illustrating a procedure of drive control processing by a driving device according to an embodiment of the present disclosure.

FIG. 5 is a flowchart illustrating a procedure of drive control processing by a driving device 210 according to one embodiment of the present disclosure.

First, the driving device 210 performs a predetermined initialization processing (step S501). The predetermined initialization processing includes, for example, a processing of deleting the torque constant ratio and the induced voltage constant stored in the correction value memory 313.

Next, the driving device 210 performs correction value calculation processing (step S502). In the correction value calculation processing, correction values (torque constant ratio and induced voltage constant) for correcting the voltage command values of the first motor 221 and the second motor 222 are obtained, and the correction values are stored in the correction value memory 313. Details of the correction value calculation processing are described later with reference to FIG. 6.

Then, the driving device 210 performs a normal motor driving operation (step S503). Here, the corrector 314 corrects the voltage command values of the first motor 221 and the second motor 222 according to the correction values obtained in step S502, and the first motor 221 and the second motor 222 are driven based on the corrected voltage command values.

Thereafter, the driving device 210 determines whether or not a predetermined monitoring time has elapsed since the correction value is obtained in step 502 (step S504). In step S504, in a case where the driving device 210 determines that the predetermined monitoring time has not elapsed ("No" in step S504), the driving device 210 returns the processing to step S503 and executes the normal operation again. On the other hand, in a case where the driving device 210 determines in step S504 that the predetermined monitoring time has elapsed ("Yes" in step S504), the driving device 210 returns the processing to step S502 and executes the correction value calculation processing again.

Procedure of Correction Value Calculation Processing by Driving Device 210

Figure 6:
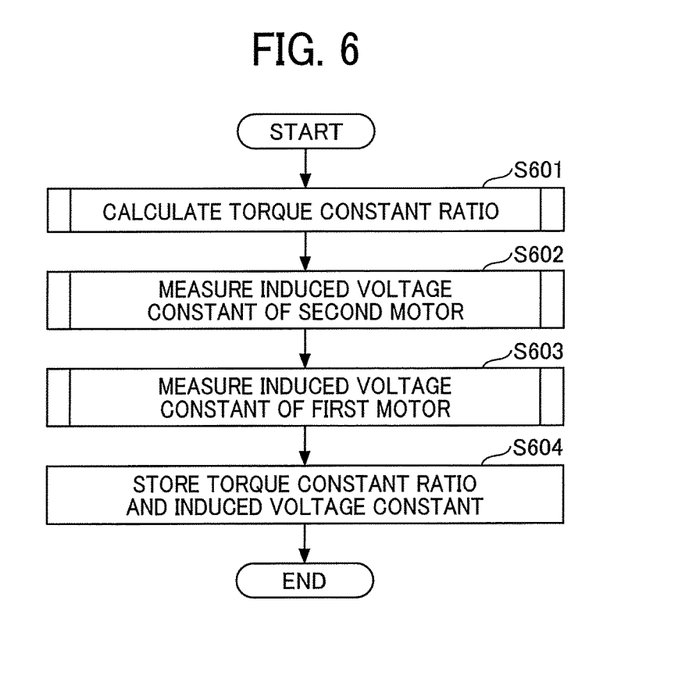
FIG. 6 is a flowchart illustrating a procedure of a correction processing by the driving device according to an embodiment of the present disclosure.

FIG. 6 is a flowchart illustrating a procedure of correction value calculation processing by the driving device 210 according to one embodiment of the present disclosure. Here, the correction value calculation processing (step S502) illustrated in FIG. 5 are described in detail.

First, the torque constant ratio calculator 311 calculates the torque constant ratio $V_{b1}/V_{b2}$ between the first motor 221 and the second motor 222 (step S601). Next, the induced voltage constant gauge 312 measures the induced voltage constant $K_{e2}=V_{e2}/\omega_2$ of the second motor 222 (step S602). In addition, the induced voltage constant gauge 312 measures the induced voltage constant $K_{e1}=V_{e1}/\omega_1$ of the first motor 221 (step S603). Then, the correction value memory 313 stores the torque constant ratio calculated in step S601 and the induced voltage constant measured in steps S602 and S603 (step S604). Thereafter, the driving device 210 ends the series of correction value calculation processing illustrated in FIG. 6.

Details of the torque constant ratio calculation processing (step S601) are described later with reference to FIG. 7. Details of the induced voltage constant measurement processing (steps S602 and S603) are described later with reference to FIG. 8.

Procedure of Torque Constant Ratio Calculation Processing by Torque Constant Ratio Calculator 311

Figure 7:
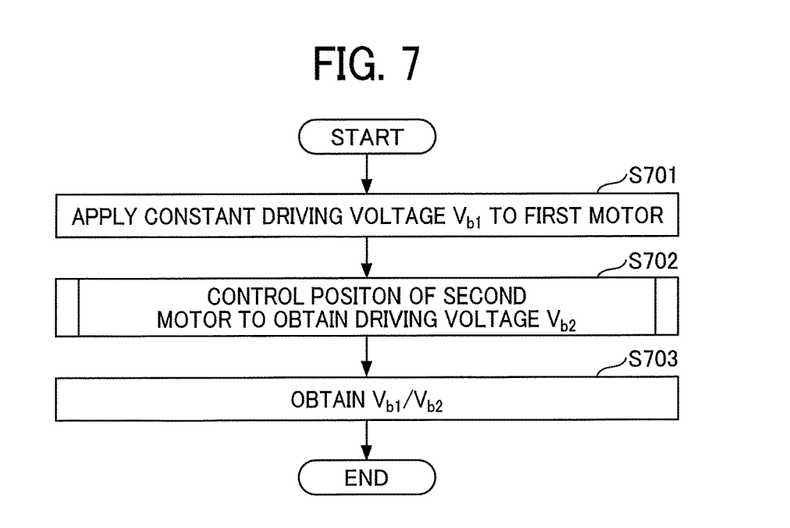
FIG. 7 is a flowchart illustrating a procedure of torque constant ratio calculation processing by a torque constant ratio calculator according to an embodiment of the present disclosure.

FIG. 7 is a flowchart illustrating a procedure of a torque constant ratio calculation processing by the torque constant ratio calculator 311 according to one embodiment of the present disclosure.

First, the torque constant ratio calculator 311 applies a constant driving voltage $V_{b1}$ to the first motor 221 to drive the first motor 221 (step S701).

Next, the torque constant ratio calculator 311 drives the second motor 222 to generate a torque in a direction different from that of the first motor 221 in the second motor 222, thereby stopping the rotation of the output shaft 300. Then, the torque constant ratio calculator 311 obtains the driving voltage $V_{b2}$ of the second motor 222 when the output shaft 300 is stopped (step S702).

The torque constant ratio calculator 311 calculates the torque constant ratio between the first motor 221 and the second motor 222 based on the driving voltage $V_{b1}$ used in step S701 and the driving voltage $V_{b2}$ obtained in step S702 (Step S703). Specifically, the torque constant ratio calculator 311 calculates $V_{b1}/V_{b2}$ as the torque constant ratio.

Here, when the output torque of the first motor 221 is $T_1$, the torque constant is $K_{t1}$, the current is $i_1$, and the coil resistance is $R_1$, the following Equation 1 is satisfied.

$$T_1 = i_1 \times K_{t1} = K_{t1} \cdot (V_{b1}/R_1) \qquad \text{Equation 1}$$

Similarly, when the output torque of the second motor 222 is $T_2$, the torque constant is $K_{t2}$, the current is $i_2$, and the coil resistance is $R_2$, the following Equation 2 is satisfied.

$$T_2 = i_2 \times K_{t2} = K_{t2} \cdot (V_{b2}/R_2) \qquad \text{Equation 2}$$

Therefore, when the output torque of the first motor 221 is equal to the output torque of the second motor 222, the following Equation 3 is satisfied.

$$K_{t1} \cdot (V_{b1}/R_1) = K_{t2} \cdot (V_{b2}/R_2) \qquad \text{Equation 3}$$

As a result, the torque constant ratio can be expressed by the following Equations 4 and 5.

$$K_{t2}/K_{t1} = (R_2/R_1) \cdot (V_{b1}/V_{b2}) \qquad \text{Equation 4}$$

$$V_2 = (R_2/R_1) \cdot (K_{t1}/K_{t2}) \cdot V_1 = (V_{b2}/V_{b1}) \cdot V_1 \qquad \text{Equation 5}$$

Therefore, the torque constant ratio calculator 311 can calculate only $V_{b1}/V_{b2}$ as the torque constant ratio for matching the output torques of the two motors 221 and 222 each other. Even if at least one of $R_1$, $R_2$, $K_{t1}$, and $K_{t2}$ has variations, it is not necessary to measure these values.

Induced Voltage Constant Measurement Processing by Induced Voltage Constant Gauge 312

Figure 8:
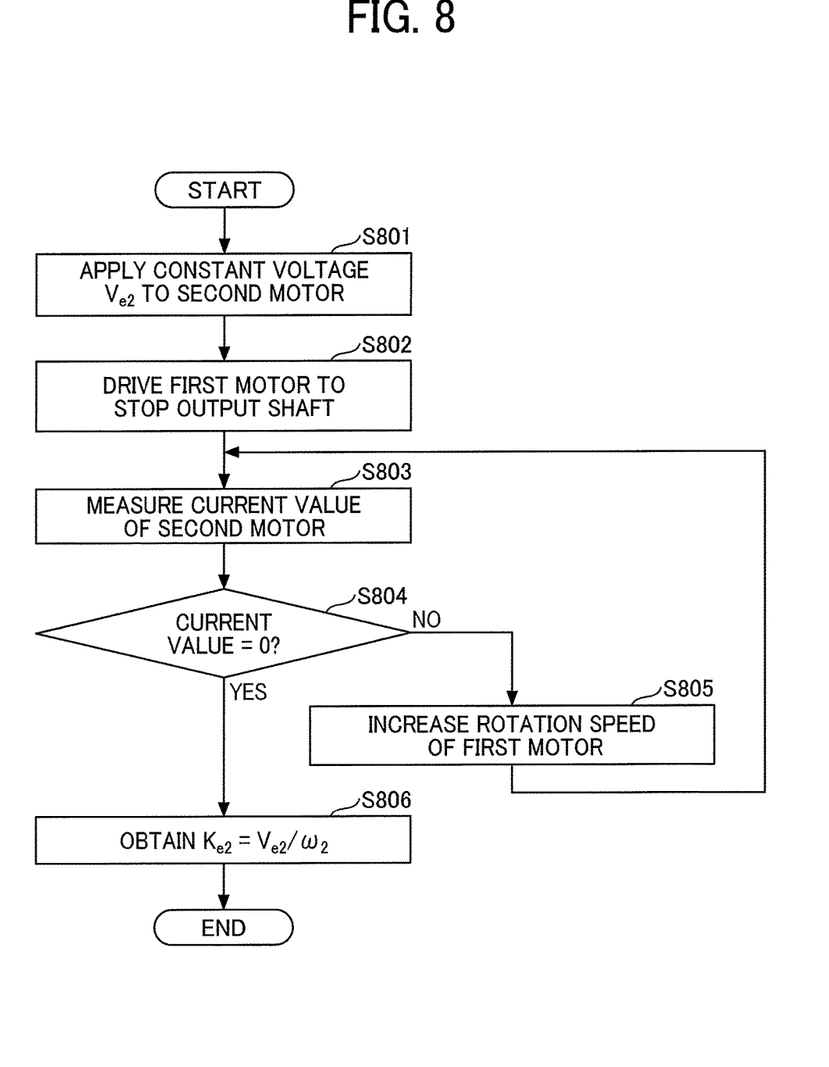
FIG. 8 is a flowchart illustrating a procedure of an induced voltage constant measurement processing by an induced voltage constant gauge according to an embodiment of the present disclosure.

FIG. 8 is a flowchart illustrating the induced voltage constant measurement processing by the induced voltage constant gauge 312 according to one embodiment of the present disclosure. Here, only processing for measuring the induced voltage constant $K_{e2}=V_{e2}/\omega_2$ of the second motor 222 is described. However, by replacing the first motor 221 and the second motor 222 with each other, the induced voltage constant $K_{e1}=V_{e1}/\omega_1$ of the first motor 221 can be described as well.

First, the induced voltage constant gauge 312 applies a constant driving voltage $V_{e2}$ (voltage obtained by multiplying the power supply voltage V by the PWM duty cycle of the second motor 222) to the second motor 222, thereby driving the second motor 222 (step S801).

Next, the induced voltage constant gauge 312 drives the first motor 221 to generate a torque of the first motor 221 in a direction different from that of the second motor 222, thereby stopping the rotation of the output shaft 300 (step S802).

Next, the induced voltage constant gauge 312 measures the current value of the second motor 222 (step S803). Then, the induced voltage constant gauge 312 determines whether or not the current value of the second motor 222 has become 0 (step S804). For example, the induced voltage constant gauge 312 refers to the current value of the current flowing through the resistor $R_2$ supplied via the A/D 218 to determine whether or not the current value of the second motor 222 has become 0.

In step S804, in a case where the induced voltage constant gauge 312 determines that the current value of the second motor 222 is not 0 ("No" in step S804), the induced voltage constant gauge 312 increases the rotation speed of the first motor 221 by a certain amount (step S805). Then, the induced voltage constant gauge 312 again executes the processing from step S803 onward.

On the other hand, in a case where the induced voltage constant gauge 312 determines that the current value of the second motor 222 has become 0 ("Yes" in step S804), the induced voltage constant gauge 312 calculates $K_{e2}=V_{e2}/\omega_2$ as the induced voltage constant (step S806). Then, the induced voltage constant gauge 312 ends the process illustrated in FIG. 8.

If the driving voltage of the second motor 222 is $V_{e2}$, the current value of the current flowing through the second motor 222 is $V_{e2}/R_2$ when the rotation speed of the first motor 221 is set to 0.

As the driving voltage of the first motor 221 is increased in a state where the driving voltage $V_{e2}$ of the second motor 222 continues to be applied, the output torque of the first motor 221 outperforms the output torque of the second motor 222. Therefore, the output shaft 300 rotates, and accordingly, the second motor 222 also rotates. As the rotation speed of the first motor 221 increases, the current flowing through the second motor 222 decreases due to the induced voltage of the second motor 222.

Assuming that the induced voltage constant of the second motor 222 is $K_{e2}$, $V_{e2} - K_{e2} \omega_2 = 0$ when the rotation speed is $\omega_2 = V_{e2}/K_{e2}$. As a result, $K_{e2} = V_{e2}/\omega_2$ is obtained as the induced voltage constant of the second motor 222.

Procedure of Correction Processing by Corrector 314

Figure 9:
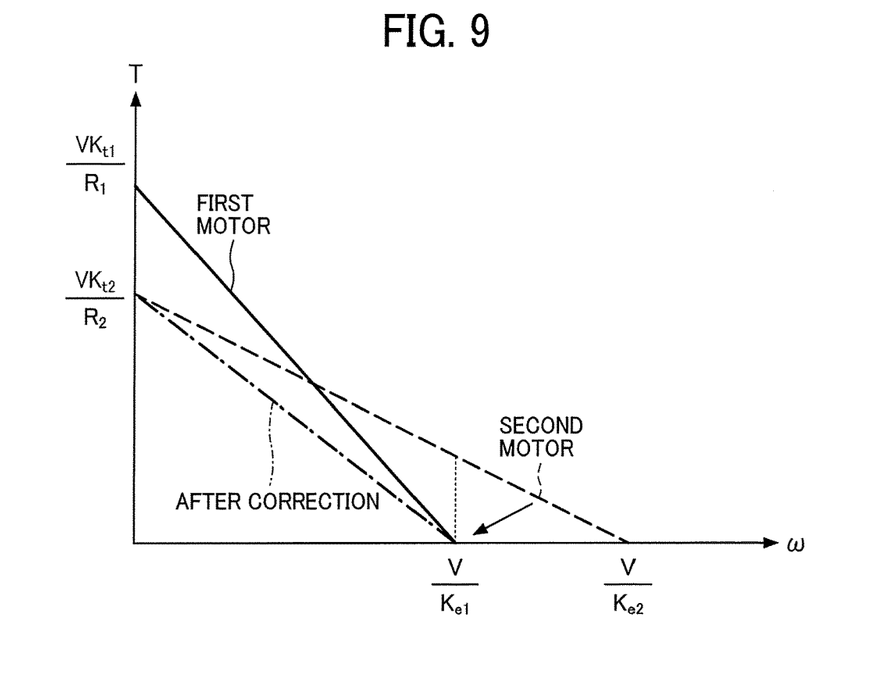
FIG. 9 is a graph illustrating the correction processing by a corrector according to an embodiment of the present disclosure.
Figure 10:
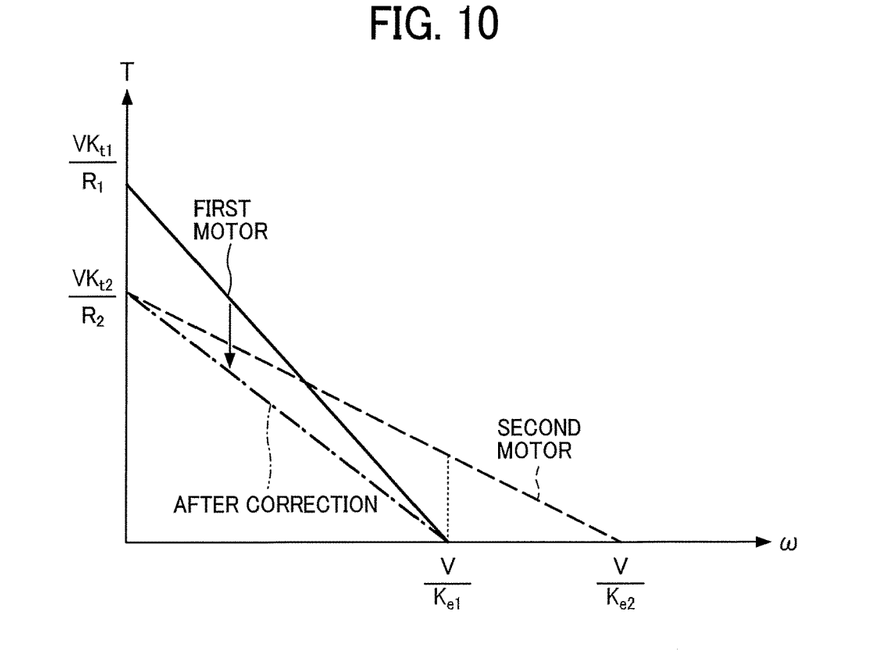
FIG. 10 is a graph illustrating the correction processing by the corrector according to an embodiment of the present disclosure.

FIGS. 9 and 10 are graphs illustrating correction processing by the corrector 314 according to the embodiment of the present disclosure.

The first motor 221 and the second motor 222 rotate in the same direction and at the same speed when the same driving voltage is applied. Therefore, in order to make the output torques of the first motor 221 and the second motor 222 coincide with each other, the corrector 314 of the present embodiment makes the rotation speed (the number of rotations)-torque characteristics (N-T characteristic) of the two motors 221 and 222 coincide.

For example, as illustrated in FIG. 9, the induced voltage constants $K_{e1}$ and $K_{e2}$ measured by the induced voltage constant gauge 312 are used to obtain a relation between the rotation speed (the number of rotations) and torque, represented as an N-T characteristic curve (solid line in FIG. 9) of the first motor 221 and an N-T characteristic curve (broken line in FIG. 9) of the second motor 222. In this case, the output torque of the first motor 221 and the output torque of the second motor 222 become 0 at different rotation speeds. Therefore, the corrector 314 corrects the output torques of the first motor 221 and the second motor 222 so that the output torques thereof become 0 at the same rotation speed.

For example, in the case of $K_{e1} > K_{e2}$, the corrector 314 corrects the voltage command value of the second motor 222 according to the following Equation 6 so that the output torque of the second motor 222 becomes 0 at the rotation speed $V/K_{e1}$ at which the output torque of the first motor 221 becomes 0. Note that, in Equation 6, V is the voltage command value before correction and $V_2$ is the corrected voltage command value.

$$V_2 = V - (K_{e1} - K_{e2})\omega \quad \text{Equation 6}$$

As a result, the N-T characteristic curve (dash-single-dot line in FIG. 9) of the second motor 222 after correction is expressed by the following Equation 7.

$$\begin{aligned} T_2 &= K_{t2} \cdot (V_2 - K_{e2}\omega)/R_2 \\ &= K_{t2} \cdot (V - (K_{e1} - K_{e2})\omega - K_{e2}\omega)/R_2 \\ &= K_{t2} \cdot (V - K_{e1}\omega)/R_2 \end{aligned} \quad \text{Equation 7}$$

It is to be noted that the correction described above corresponds to the correction of the N-T characteristic curve of the second motor 222 indicated by arrow in FIG. 9.

Next, the corrector 314 corrects the output torque of the first motor 221 so as to coincide with the output torque of the second motor 222 by the following Equation 9 obtained by modifying the following Equation 8.

$$K_{t2} \cdot (V - K_{e1}\omega)/R_2 = K_{t1} \cdot (V_1 - K_{e1}\omega) \quad \text{Equation 8}$$

$$\begin{aligned} V_1 &= R_1/R_2 \cdot K_{t2}/K_{t1} \cdot (V - K_{e1}\omega) + K_{e1}\omega \\ &= V_{b1}/V_{b2} \cdot (V - K_{e1}\omega) + K_{e1}\omega \end{aligned} \quad \text{Equation 9}$$

As a result, the N-T characteristic curve (dash-single-dot line in FIG. 10) of the first motor 221 after correction is expressed by the following Equation 10.

$$\begin{aligned} T_1 &= K_{t1} \cdot (V_1 - K_{e1}\omega)/R_1 \\ &= K_{t1} \cdot (R_1/R_2 \cdot K_{t2}/Kt_1 \cdot (V - K_{e1}\omega) + \\ &\quad K_{e1}\omega - K_{e1}\omega)/R_1 \\ &= K_{t2} \cdot (V - K_{e1}\omega)/R_2 \end{aligned} \quad \text{Equation 10}$$

From the above-described Equations 7 and 10, it can be confirmed that $T_1 = T_2$, that is, the output torque of the first motor 221 and the output torque of the second motor 222 coincide with each other.

Offset Control by Offset Controller 213

Subsequently, the offset control by the offset controller 213 is described with reference to FIGS. 11 to 14. The offset controller 213 included in the driving device 210 (see FIG. 3) controls the voltage command values of the two motors 221 and 222 to eliminate the backlash between the two motors 221 and 222 and the output shaft 300 when the first motor 221 and the second motor 222 are driven.

Specific Example of Offset Control

Figure 11:
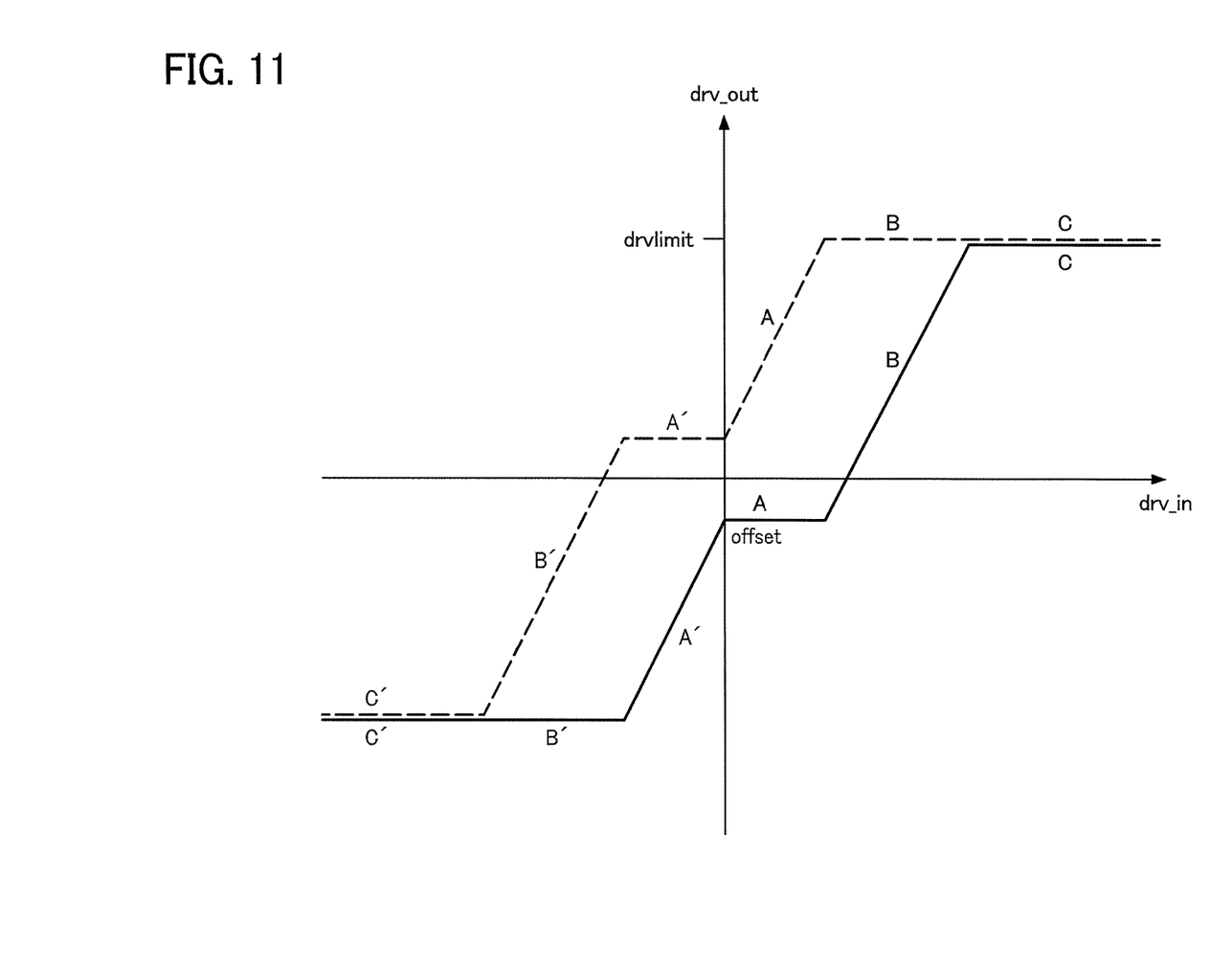
FIG. 11 is a graph illustrating a specific example of offset control by an offset controller according to an embodiment of the present disclosure.

FIG. 11 is a graph illustrating a specific example of offset control by the offset controller 213 according to the embodiment of the present disclosure. In the graph of FIG. 11, a horizontal axis represents an input voltage command value drvin before the control by the offset control, and a vertical axis represents an output voltage command value drvout after the control by the offset control. In addition, in the graph of FIG. 11, the solid line represents the voltage command value of the first motor 221, and the broken line represents the voltage command value of the second motor 222.

In the example of FIG. 11, the offset controller 213 outputs the voltage command value of the first motor 221 (offset voltage command value) indicated by character A in FIG. 11 so that an offset voltage Offset to drive the output shaft 300 in a direction opposite the driving direction is applied to the first motor 221. In this state, the offset controller 213 controls the voltage command value of the second motor 222 so that the driving voltage to drive the output shaft 300 in the driving direction is progressively applied while a voltage equal to the absolute value of the offset voltage Offset is applied to the second motor 222. As a result, driving forces in opposite directions are applied to the output shaft 300 from both of the two motors 221 and 222, so that the backlash between the output shaft 300 and the two motors 221 and 222 is eliminated. It should be noted that the offset voltage Offset is for eliminating the gap between the gears and no external load is applied, therefore, about 5% of the driving voltage is sufficient.

Next, as indicated by character B in FIG. 11, when the output of the second motor 222 reaches the limit value at the driving voltage drvlimit, the offset controller 213 controls the voltage command value of the second motor 222 to keep the state where the driving voltage drvlimit is applied to the second motor 222. In this state, the offset controller 213 controls the voltage command value of the first motor 221 so that the driving voltage to drive the output shaft 300 in the driving direction is progressively applied to the first motor 221. As a result, driving forces in the same direction are applied to the output shaft 300 from both of the two motors 221 and 222, so that the driving torque of the output shaft 300 can be increased. At that time, the driving voltage of the first motor 221 may be increased at the same rate of increase of the driving voltage of the second motor 222 indicated by character A in FIG. 11.

Then, as indicated by character C in FIG. 11, when both outputs of the two motors 221 and 222 reach limit values of the driving voltage drvlimit, the offset controller 213 controls the voltage command value of each of the two motors 221 and 222 so as to maintain a state where the driving voltage drvlimit is applied.

In the example of FIG. 11, characters A' to C' in FIG. 11 represent an example, which are symmetrical with characters A to C, of driving each motor in a direction opposite to the example of A to C.

Functional Configuration of Offset Controller 213

Figure 12:
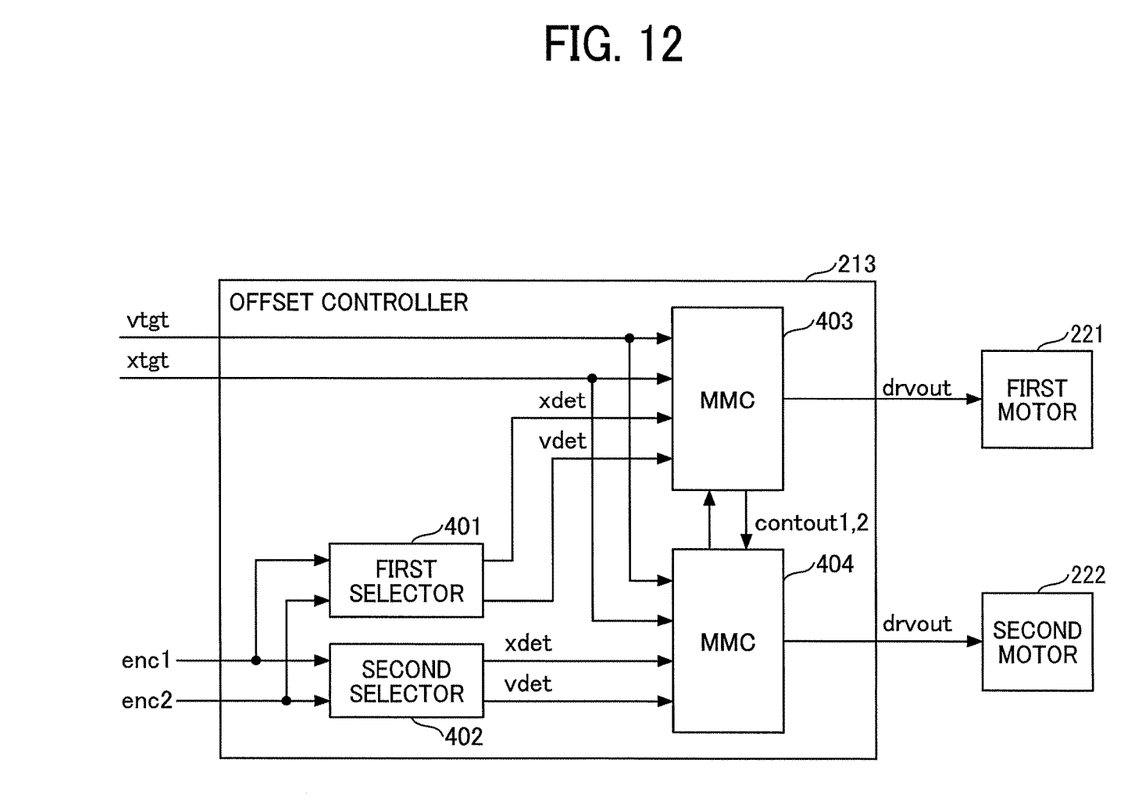
FIG. 12 is a functional block diagram of the offset controller according to an embodiment of the present disclosure.

FIG. 12 is a functional block diagram of the offset controller 213 according to the embodiment of the present disclosure.

As illustrated in FIG. 12, the offset controller 213 includes a first selector 401, a second selector 402, a multi-motor controller (MMC) 403, and an MMC 404.

The first selector 401 and the second selector 402 respectively receive the encoder signal enc1 of the first motor 221 output from the encoder 225 and the encoder signal enc2 of the second motor 222 output from the encoder 226. Then, the first selector 401 and the second selector 402 select the encoder signal enc1, the encoder signal enc2, or a value that is the average of the encoder signal enc1 and the encoder signal enc2, and output a position detection signal xdet and a velocity detection signal vdet corresponding to the selected signal.

The MMC 403 receives the velocity target vtgt and the position target xtgt from the host controller. Further, the MMC 403 receives the position detection signal xdet and the velocity detection signal vdet output from the first selector 401. Then, the MMC 403 performs PID control based on each input signal to generate the input voltage command value drvin, converts the input voltage command value drvin to the output voltage command value drvout as illustrated in FIG. 11, and outputs the output voltage command value drvout to the first motor 221. In addition, the MMC 403 outputs the generated input voltage command value drvin as a control voltage contout2 to the MMC 404. In addition, the MMC 403 can use the control voltage contout2 output from the MMC 404 instead of the input voltage command value drvin to convert to the output voltage command value drvout.

The MMC 404 receives the velocity target vtgt and the position target xtgt from the host controller. Further, the MMC 404 receives the position detection signal xdet and the velocity detection signal vdet output from the second selector 402. Then, the MMC 404 performs PID control based on each input signal to generate the input voltage command value drvin, converts the input voltage command value drvin to the output voltage command value drvout as illustrated in FIG. 11, and outputs the output voltage command value drvout to the second motor 222. In addition, the MMC 404 outputs the generated input voltage command value drvin as a control voltage contout1 to the MMC 403. In addition, the MMC 404 can use the control voltage contout1 output from the MMC 403 instead of the input voltage command value drvin to convert to the output voltage command value drvout.

Functional Configuration of MMC 403

Figure 13:
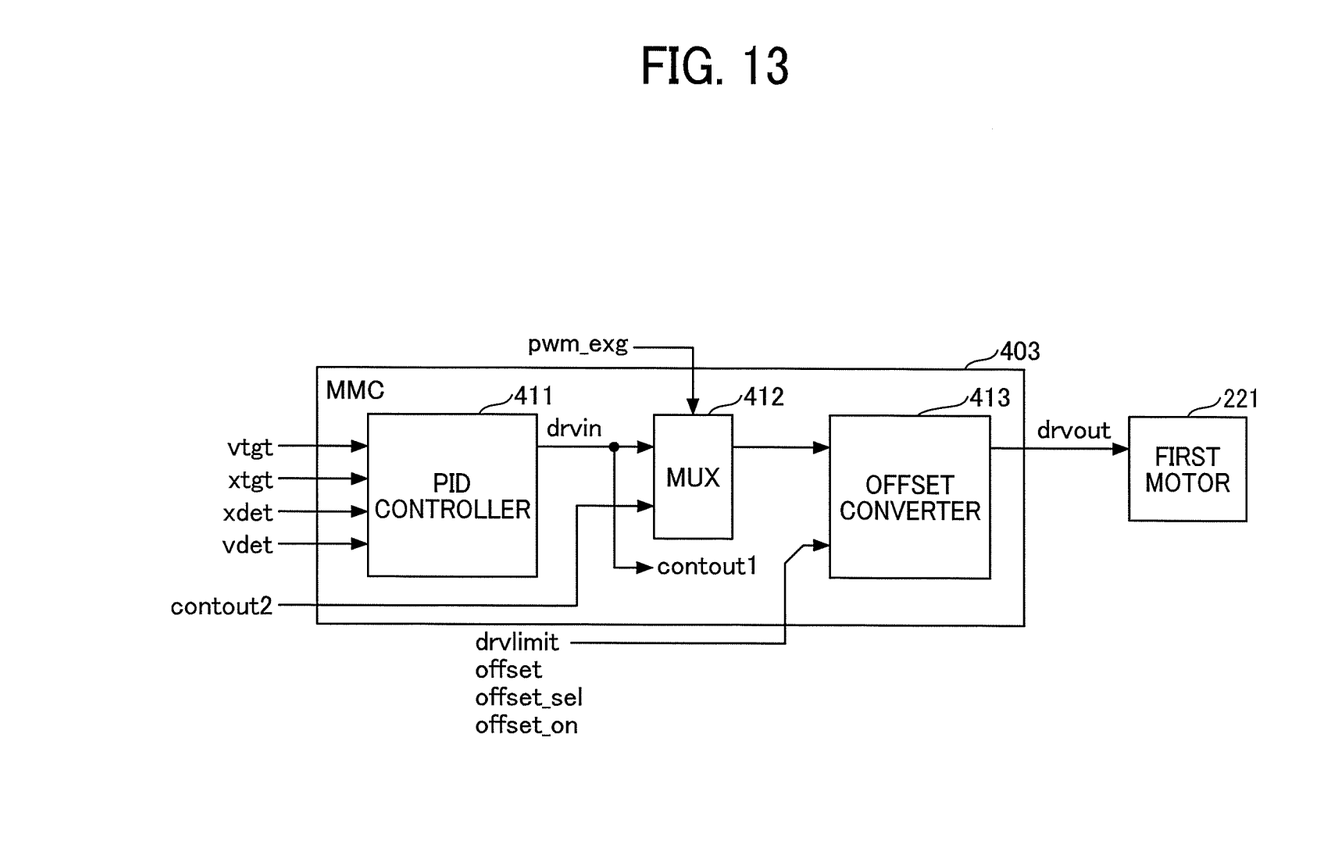
FIG. 13 is a functional block diagram of an MMC included in the offset controller according to an embodiment of the present disclosure.

FIG. 13 is a functional block diagram of the MMC 403 included in the offset controller 213 according to the embodiment of the present disclosure. It is to be noted that since the functional configuration of the MMC 404 is the same as the functional configuration of the MMC 403, illustration and explanation thereof are omitted.

As illustrated in FIG. 13, the MMC 403 includes a PID controller 411, a multiplexer (MUX) 412, and an offset converter 413.

The PID controller 411 receives the velocity target vtgt, the position target xtgt, the position detection signal xdet, and the velocity detection signal vdet. Then, the PID controller 411 performs PID control based on these signals to generate the input voltage command value drvin, and outputs the input voltage command value drvin to the MUX 412.

The MUX 412 selects and outputs the input voltage command value drvin output from the PID controller 411 or the control voltage contout2 output from the MMC 404 based on an external input signal pwm_exg.

As illustrated in FIG. 11, the offset converter 413 converts the input voltage command value drvin (or the control voltage contout2) to the output voltage command value drvout, and outputs the output voltage command value drvout to the first motor 221.

The offset converter 413 receives parameters drvlimit, offset, offset_sel, offset_on as various parameters. The parameter drvlimit is the voltage when the output of the motor reaches the limit value. The parameter offset is the offset voltage applied to an opposite polarity to the driving voltage. The parameter offset_sel is a selection value of whether to apply a driving voltage in the positive polarity or in the negative polarity. The parameter offset_on is a selection value of whether or not to perform offset control. These parameters are stored in advance in, for example, a memory included in the driving device 210.

Functional Configuration of First Selector 401

Figure 14:
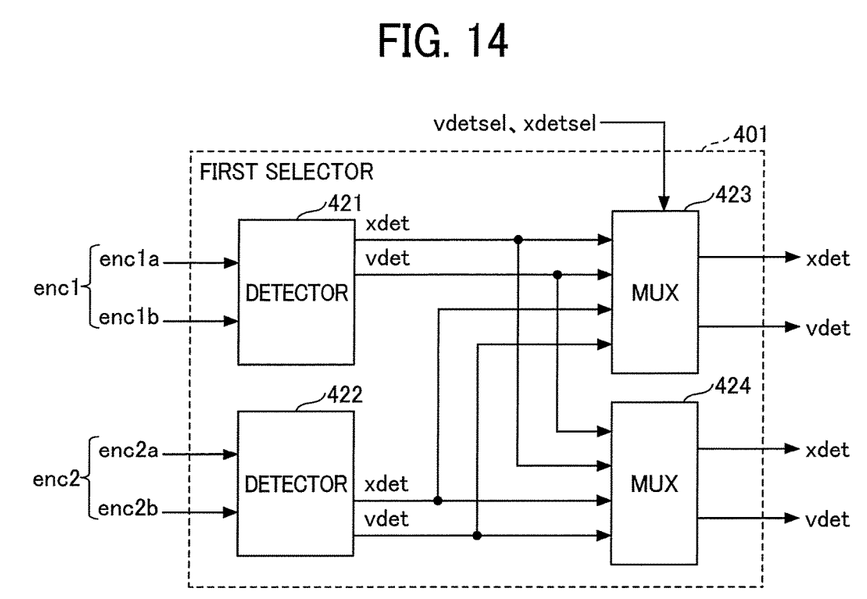
FIG. 14 is a functional block diagram of a first selector included in the offset controller according to an embodiment of the present disclosure.

FIG. 14 is a functional block diagram of a first selector 401 included in the offset controller 213 according to the embodiment of the present disclosure. It is to be noted that since the functional configuration of the second selector 402 is the same as the functional configuration of the first selector 401, illustration and explanation thereof are omitted.

As illustrated in FIG. 14, the first selector 401 includes a detector 421, a detector 422, a MUX 423, and a MUX 424.

The detector 421 receives the encoder signal enc1 output from the encoder 225 of the first motor 221. The encoder signal enc1 includes an encoder signal enc1a and an encoder signal enc1b having a phase difference (for example, 90 degrees) from each other. The detector 421 generates the position detection signal xdet and the velocity detection signal vdet based on the encoder signal enc1a and the encoder signal enc1b, and outputs the generated two signals to each of the MUX 423 and the MUX 424.

The detector 422 receives the encoder signal enc2 output from the encoder 226 of the second motor 222. The encoder signal enc2 includes an encoder signal enc2a and an encoder signal enc2b having a phase difference (for example, 90 degrees) from each other. The detector 422 generates the position detection signal xdet and the velocity detection signal vdet based on the encoder signal enc2a and the encoder signal enc2b, and outputs the generated two signals to each of the MUX 423 and the MUX 424.

The MUX 423 and the MUX 424 select the encoder signal enc1, the encoder signal enc2, or a value that is the average of the encoder signal enc1 and the encoder enc2, and output the position detection signal xdet and the velocity detection signal vdet corresponding to the selected signal. At that time, the position detection signal xdet is selected based on an external input signal xdetsel. In addition, the velocity detection signal vdet is selected based on an external input signal vdetsel.

As described above, according to the drive system 200 of the present embodiment, the driving device 210 calculates the torque constant ratio between the first motor 221 and the second motor 222, measures the induced voltage constant of each of the first motor 221 and the second motor 222, and corrects the voltage command value of each of the first motor 221 and the second motor 222 based on the calculated torque constant ratio and the measured induced voltage constant. Therefore, the output torque of the first motor 221 and the output torque of the second motor 222 can be coincide with each other. As a result, according to the drive system 200 of the present embodiment, it is possible to prevent various troubles (for example, speed fluctuation, deformation of mechanism component, gear wear, etc.) that may be caused by the torque imbalance of the two motors 221 and 222. In particular, according to the drive system 200 of the present embodiment, it is unnecessary to tune each motor in order to eliminate variations in the output torque of the motor, so that appropriate control of the output torque of the two motors can be performed at low cost.

Further, according to the drive system 200 of the present embodiment, the driving device 210 performs offset control to convert the input voltage command value drvin of each of the first motor 221 and the second motor 222 into the output voltage command value drvout. Therefore, the drive system 200 can drive the two motors 221 and 222 while eliminating the backlash between the two motors 221 and 222 and the output shaft 300. That is, according to the drive system 200 of the present embodiment, the backlash can be eliminated by voltage control at low cost as compared with a comparative method for eliminating the backlash by current control.

The above-described embodiments are just examples and do not limit the present disclosure. Modifications and alterations of the embodiments can be made without departing from the spirit and scope of the disclosure described in the claims unless limited in the above description.

For example, in the above-described embodiment, the present disclosure is applied to an image forming apparatus 100. However, the present disclosure is applicable to any configuration in which the driven object is driven by two motors.

For example, the present disclosure can be applied to a configuration to drive a conveyance roller in a conveyance device that conveys a sheet-like prepreg, banknotes, or the like. In addition, the present disclosure can be applied to a configuration to obtain a driving force by rotary motion of a rotary shaft driven by two motors, such as a car, a robot, or an amusement machine.

Figure 15:
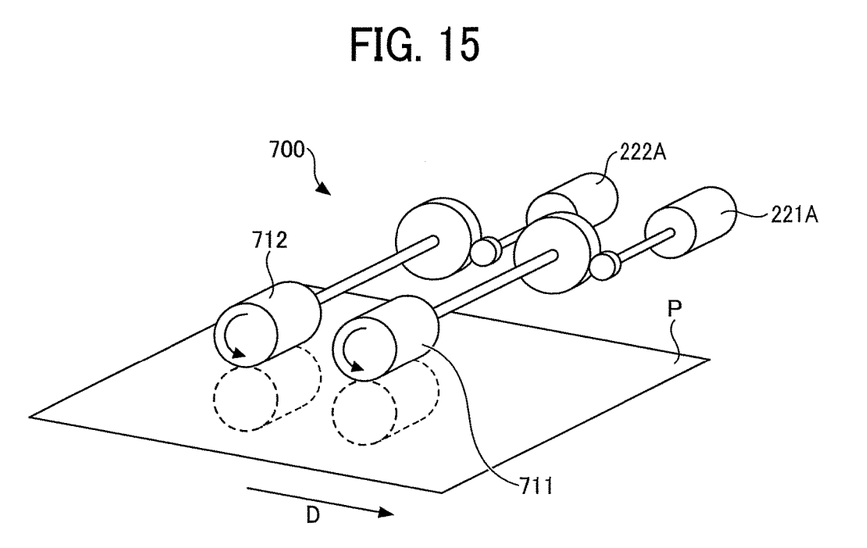
FIG. 15 is a schematic view of a conveyance device according to an embodiment of the present disclosure.

For example, FIG. 15 is a schematic view of a conveyance device 700 according to an embodiment of the present disclosure. The conveyance device 700 illustrated in FIG. 15 is a device for conveying a sheet P. As illustrated in FIG. 15, the conveyance device 700 includes a first motor 221A, a conveyance roller 711, a conveyance roller 712, and a second motor 222A. The conveyance roller 711 rotates by driving of the first motor 221A. The conveyance roller 712 is rotated by the driving of the second motor 222A. In the conveyance device 700, the conveyance rollers 711 and the conveyance rollers 712 rotate in the same direction. Therefore, the combined torque of the output torque of the first motor 221A and the output torque of the second motor 222A can convey the sheet P in the conveyance direction indicated by arrow D in FIG. 15. For example, in the conveyance device 700 with such configuration, the drive system 200 according to the above-described embodiment is applied and controls the voltage command values of the first motor 221 and the second motor 222. Therefore, the output torques of the two motors 221 and 222 can be unified with each other. In addition, the drive system 200 is applied to the conveyance device 700 and performs the same control as the backlash control described in the embodiment to give a constant tension to the paper P. Therefore, it is possible to prevent crease of the sheet P.

In the above-described embodiment, the driving device 210 includes both the offset controller 213 and the correction controller 214. Alternatively, the driving device 210 may include only one of the offset controller 213 and the correction controller 214. Note that, the controller in the present embodiment may be a combination of the position speed controllers 211 and 212 and the offset controller 213, or may be only the position speed controllers 211 and 212.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A driving device, comprising:
   a controller configured to output a first voltage command value to drive a first motor to transmit a driving force to a driven object and a second voltage command value to drive a second motor to transmit a driving force to the driven object; and
   a corrector configured to correct the first voltage command value and the second voltage command value, based on a parameter relating to driving of the first motor and the second motor obtained when an output torque of the first motor and an output torque of the second motor are applied to the driven object in opposite directions and the driven object is stopped.

2. The driving device according to claim 1,
   wherein the corrector is further configured to correct the first voltage command value and the second voltage command value, based on a driving voltage of the first motor and a driving voltage of the second motor obtained when the output torque of the first motor and the output torque of the second motor are applied to the driven object in the opposite directions and the driven object is stopped.

3. The driving device according to claim 2, wherein the corrector is further configured to correct at least one of the first voltage command value and the second voltage command value to match an N-T characteristic of the first motor and an N-T characteristic of the second motor such that the torque of the first motor and the torque of the second motor are same at a same rotation speed.

4. The driving device according to claim 1, wherein the corrector is further configured to correct the first voltage command value and the second voltage command value, based on a driving voltage of one of the first motor and the second motor and a rotation speed of the one of the first motor and the second motor obtained when a rotation speed of another one of the first motor and the second motor is adjusted and a current of the one of the first motor and the second motor is adjusted to 0.

5. A drive system, comprising:
the first motor;
the second motor; and
the driving device according to claim 1.

6. An image forming apparatus, comprising:
the drive system according to claim 5.

7. A conveyance device, comprising:
the drive system according to claim 5.

8. A driving device comprising:
a controller configured to output a first voltage command value to drive a first motor to transmit a driving force to a driven object and a second voltage command value to drive a second motor to transmit a driving force to the driven object;
a torque constant ratio calculator configured to calculate a torque constant ratio between the first motor and the second motor;
an induced voltage constant gauge configured to measure an induced voltage constant of each of the first motor and the second motor; and
a corrector configured to correct the first voltage command value and the second voltage command value, based on the torque constant ratio calculated by the torque constant ratio calculator and the induced voltage constant measured by the induced voltage constant gauge, to match an output torque of the first motor and an output torque of the second motor.

9. The driving device according to claim 8, wherein the torque constant ratio calculator is configured to calculate the torque constant ratio defined by a ratio between a driving voltage of the first motor and a driving voltage of the second motor obtained when the output torque of the first motor and the output torque of the second motor are applied to the driven object in opposite directions and the driven object is stopped.

10. The driving device according to claim 8, wherein the induced voltage constant gauge is configured to calculate the induced voltage constant defined by a ratio between a driving voltage of one of the first motor and the second motor and a rotation speed of the one of the first motor and the second motor obtained when the output torque of the first motor and the output torque of the second motor are applied to the driven object in opposite directions, a rotation speed of another one of the first motor and the second motor is adjusted, and a current of the one of the first motor and the second motor is adjusted to 0.

11. A driving method for driving a first motor and a second motor that transmit driving forces to a driven object, the driving method comprising:
outputting a first voltage command value to drive the first motor and a second voltage command value to drive the second motor; and
correcting the first voltage command value and the second voltage command value, based on a parameter relating to driving of the first motor and the second motor obtained when an output torque of the first motor and an output torque of the second motor are applied to the driven object in opposite directions and the driven object is stopped.

* * * * *